United States Patent

[11] 3,609,696

[72] Inventor Jan Doting
Nijmegen, Netherlands
[21] Appl. No. 757,860
[22] Filed Sept. 6, 1968
[45] Patented Sept. 28, 1971
[73] Assignee The Singer Company

[54] PROGRAMMED ARRANGEMENT FOR SERIAL HANDLING OF NUMERICAL INFORMATION
4 Claims, 6 Drawing Figs.

[52] U.S. Cl. .......... 340/172.5, 235/170
[51] Int. Cl. .......... G06f 13/02
[50] Field of Search .......... 340/172.5; 235/170

[56] References Cited

UNITED STATES PATENTS

| | | | |
|---|---|---|---|
| 2,823,855 | 2/1958 | Nelson | 235/170 |
| 2,861,740 | 11/1958 | Chenus | 235/170 |
| 2,890,831 | 6/1959 | Townsend | 235/170 |
| 3,105,898 | 10/1963 | Bell et al. | 235/170 |
| 3,240,922 | 3/1966 | Scholten | 235/170 |
| 3,257,645 | 6/1966 | Lekven | 340/172.5 |
| 3,351,917 | 11/1967 | Shimabukuro | 340/172.5 |
| 3,413,454 | 11/1968 | Frankel | 340/172.5 |

*Primary Examiner*—Gareth D. Shaw
*Assistant Examiner*—Mark Edward Nusbaum
*Attorneys*—Charles R. Lepchinsky, Ronald P. Shipman and Jay M. Cantor

ABSTRACT: A data handling system having a dynamic delay line data signal storage means selectively coupled with a static storage register or an add-subtract unit for adding or subtracting, algebraically, one set of data signals to a second set of data signals.

INVENTOR.
Jan Doting
BY
Ronald L. Lipman
AGENT

PROGRAMMED ARRANGEMENT FOR SERIAL HANDLING OF NUMERICAL INFORMATION

CROSS-REFERENCE TO RELATED APPLICATION

This application is based upon Dutch Pat. application Ser. No. 6,717,570, filed Dec. 22, 1967.

BACKGROUND OF THE INVENTION

1. Field of the Invention

This invention concerns an apparatus for the serial handling of data representative signals and more particularly concerns a data flow control arrangement wherein a calculator unit is directly coupled with a source of serial data signals for preforming arithmetic operations upon the data.

2. Description of the Prior Art

In prior art calculator devices including electronic operated calculators wherein data is read into and out of a dynamic memory is serial fashion, it is well known that in order to algebraically combine a first number with a second number, at least two storage registers are needed. The use of two storage registers is such prior art calculator devices introduces an undesirable amount of time delay between reading of a number from the memory and writing the results of an arithmetic operation on such numbers back into the memory.

SUMMARY

Briefly, stated, the present invention is achieved, in one preferred embodiment, wherein numbers or data words are stored, serial fashion, in a dynamic memory, such as an ultrasonic delay line, in a manner wherein the same order digits of a plurality of data words are grouped together and a calculating unit is coupled with the memory so as to form a closed loop data flow path. The calculating unit includes a serial binary adder-subtractor unit, a single shift register having as many stages as there are binary bits in a single digit of a data word, and a set of data flow control means or switches connect or disconnect the arithmetic unit and/or the shift register with the memory according to control signals developed during operation of the system.

It is, therefore, an object of the present invention to provide an improved data handling apparatus.

Another object of the present invention is to provide in a data handling apparatus one shift register to accomplish the same operations as previously was accomplished with two shift registers.

The features of novelty that are considered characteristic of this invention are set forth with particularity in the appended claims. The organization and method of operation of the invention may best be understood from the following description when read in connection with the accompanying drawings.

DESCRIPTION OF A PREFERRED EMBODIMENT

Figure 1:
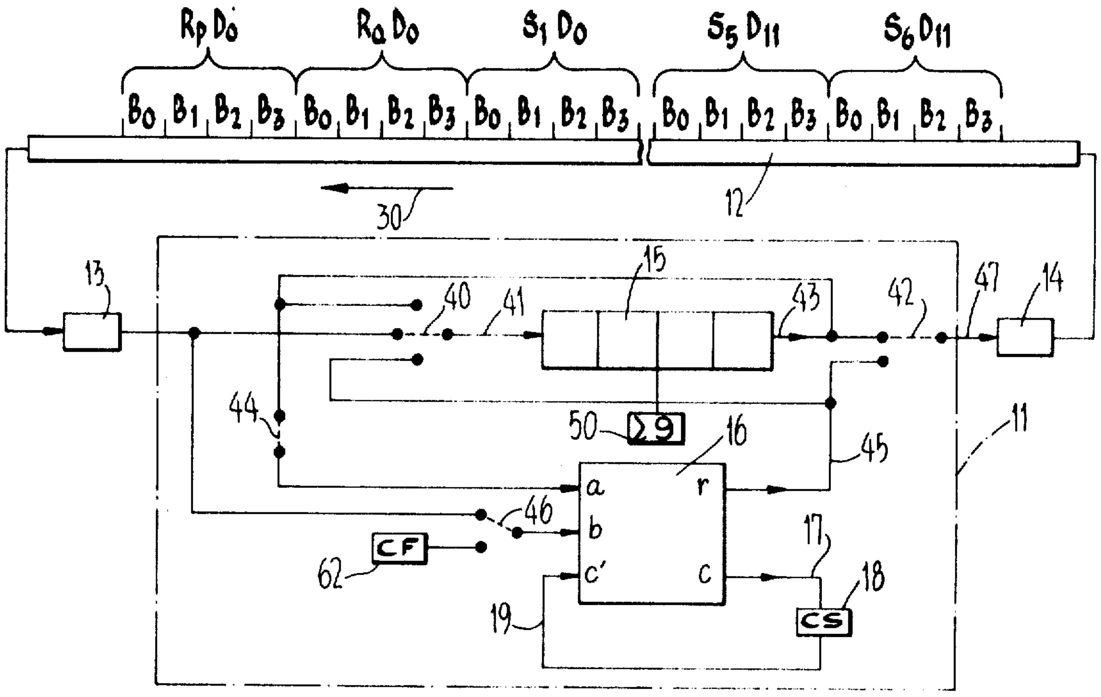
FIG. 1 is a simplified block diagram of the present invention.

FIG. 1 shows a logic schematic of an arrangement, according to the invention, for serial handling of numerical information. The arrangement comprises a calculating unit 11 under control of a control logic unit (not shown) to work directly together with a dynamic memory 12 which may comprise any suitable acoustic delay line such as that disclosed in U.S. Pat. No. 3,011,136 issued Nov. 28, 1961, and having Ser. No. 836,844.

The calculating unit 11 is connected in a closed loop data flow arrangement with the memory 12 by means of a calculator unit input amplifier 13 (which may also by termed a memory read or output amplifier) and a calculator unit output amplifier 14 (which may also be termed a memory write or input amplifier).

For practical and economical reasons, especially in a small data handling device, the memory 12 is preferably an ultrasonic delay line utilizing the magnetostrictive principle. Such delay lines are well known and generally consist of a round wire in which information travels in the form of mechanical pulses or disturbances. Because the calculating unit 11 handles electrical information, the mechanical information carrying pluses on the memory 12 have to be transformed into electrical information signals or pulses for input to the calculating unit. Likewise, electrical pluses from the output of the calculating unit have to be transformed into mechanical information pulses on the delay line. The transformation is done by means of transducers (not shown), coupled with the amplifiers 13 and 14.

The calculating unit 11 includes as major subunits a serial shift register 15, and an add-subtract unit 16 which may comprise any suitable serial binary adder-subtracter such as that disclosed in U.S. Pat. No. 2,933,252 issued Apr. 19, 1960 and having Ser. No. 629,257. The shift register accepts input signals at an input lead 41 and provides output signals on an output lead 43. The shift register 15 comprises as many stages as there are bits in each binary coded digit of the numerical word to be operated on. The construction and operation of such shift register is well known and is not described in detail herein.

The add-subtract unit 16 receives binary bits of one digit in serial fashion at an input terminal "*a*" and receives binary bits of another digit in serial fashion at an input terminal "*b*." An input terminal "*c'*" is provided on the add-subtract unit for receiving a carry (or borrow) bit which is generated at an output terminal "*c*." The add-subtract unit 16 is arranged and adapted to perform an arithmetic function upon the three input bits without time delay and provide a result bit on output terminal "*r*." Such a unit is well known and, therefore, exact details as to its construction and operation are not set forth herein.

It is assumed for this description that the memory 12 contains eight data words called $R_p$, $R_a$, $S_1$, $S_2$, $S_3$, $S_4$, $S_5$, and $S_6$, respectively. Also, it is assumed that each data word consists of 12 decimal digits, $D_0$–$D_{11}$, and each digit consists of four binary bits, $B_0$–$B_3$.

Figure 2:
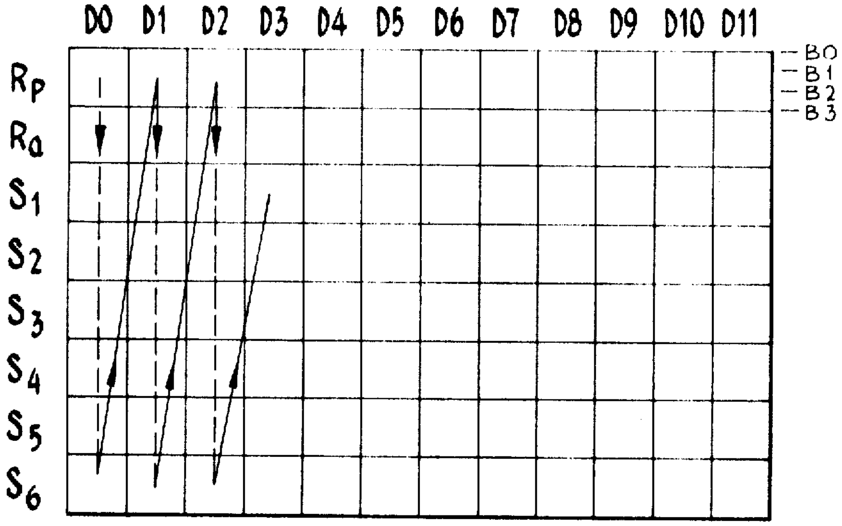
FIG. 2 is a graph demonstrating the sequence of data signals in the memory means of the present invention.

Beginning with the least significant digit $D_0$ of the lowest order data word $R_p$, the least significant digit ($D_0$) of the next lowest order words $R_a$, etc., travel the propagation direction shown by arrow 30 in FIG. 1. FIG. 2 is a graph or chart showing the sequence of all of the data words as they occur on the memory 12. Thus, it can be understood that the least significant digits ($D_0$) of each of the words $R_{p-6}$ follow each other out of the memory into the calculating unit 11 in the order shown. Then, after the least significant digit of word $S_6$ exits from the memory into the calculating unit, the next least significant digit ($D_1$) of the first word $R_p$ exits from the memory into the calculating unit and, of course, the succeeding next least significant digits of the succeeding words $R_a$–$S_6$ follow along and exit from the memory into the calculating unit, etc. It will be understood by those skilled in the art to which the present invention pertains, that the digits of each word are comprised of four binary bits and, as mentioned previously, the four bits are in binary coded decimal.

The data word $R_p$ may be termed a passive register and the data word $R_a$ may be termed an active register. According to this invention, the content of register $R_p$ and the content of the register $R_a$ may be arithmetically added or subtracted together. The result of the arithmetic operation is such that the content of register $R_p$ is not changed, but the former content of the register $R_a$ is destroyed and the sum or difference of the registers $R_p \pm R_a$ are inserted into register $R_a$. Data words $S_1$–$S_6$ may be termed storage registers.

Also, according to the present invention, the content of the active register $R_a$ and the content of the storage register $S_1$ may be arithmetically combined together (added or subtracted) and the result of such arithmetic operation is such that the content of the active register $R_a$ is not changed, but the former content of the first storage register $S_1$ is destroyed and the sum or difference of the registers $R_a \pm S_1$ are inserted into register $S_1$.

Control logic, indicated by data flow control means or switches 40, 42, 44 and 46 will set up or control the path of data signals through the calculator unit according to predetermined sequences to execute the desired operations upon the contents of the various registers as explained in more detail below. The implementation of suitable control circuitry, i.e. switching circuitry, is well known in the art as is shown by Chapter 3 entitled, Switching Networks, pages 51–80 of the textbook "Arithmetic Operations in Digital Computers" by R. K. Richards, copyright 1955 by D. Van Nostrand Company, Inc., Library Congress catalog card no. 55–6234.

The predetermined sequences for controlling various settings of the data flow control means or switches are timed sequences. Accordingly, it will be understood by those skilled in the art to which the present invention pertains that since the flow of data through the memory 12 is time dependent, the various data bits ($B_0$–$B_3$), digits ($D_0$–$D_{11}$), and registers or data words ($R_p$, $R_a$, $S_1$–$S_6$) may be identified and properly sequenced by an electronic counter and count decoding gates. Implementation of the required timing pluses is well known in the art as shown by Chapter 7, pages 174–208 of the textbook entitled "Logical Design of Digital Computers" by Montgomery Phiester, Jr., copyright 1958 by John Wiley and Sons, Inc., Library of Congress catalog no. 58–6082.

When in the idling mode (FIG. 3), i.e., no arithmetic operations to be performed on the contents of any of the registers, the control logic sets the shift register input control means or switch 40 to a condition wherein data signals from the memory are furnished to input lead 41 of the shift register 15.

The four binary coded decimals bits ($B_0$–$B_3$) of the least significant digit ($D_0$) of the passive register $R_p$ are shifted into the shift register in serial fashion. Then, the first, or least significant, bit ($B_0$) of the least significant digit ($D_0$) of the active register $R_a$ is shifted into the leftmost stage of the shift register; at the same time, the content of the rightmost or exit stage of the shift register 15 appears in the shift register output lead 43 and is directed by the shift register output control means or switch 42 to the memory's input amplifier 14.

Thus, the first bit ($B_0$) of the least significant digit ($D_0$) of the passive register $R_p$ is entered back onto the memory.

Then, the second bit ($B_1$) of the least significant digit ($D_0$) of the active register $R_a$ is entered into the leftmost stage of the shift register and, at the same time, the content of the rightmost stage of the shift register is shifted or entered onto the memory via shift register output lead 43, control switch means 42, memory input lead 47, and input amplifier 14.

From the foregoing description, it can be understood that the remainder of the bits of the digits of all the registers will circulate in a closed loop comprising the memory, the shift register, and the associated input and output amplifiers, plus the associated data flow control means.

It is to be noted that any one bit exiting from the memory is entered back onto the memory after the four shift times required for shifting the bit through register and back onto the memory. Since this is the normal circulation route, the time involved, being normal time, is considered to be without delay.

Figures 3, 4, 5, 6:
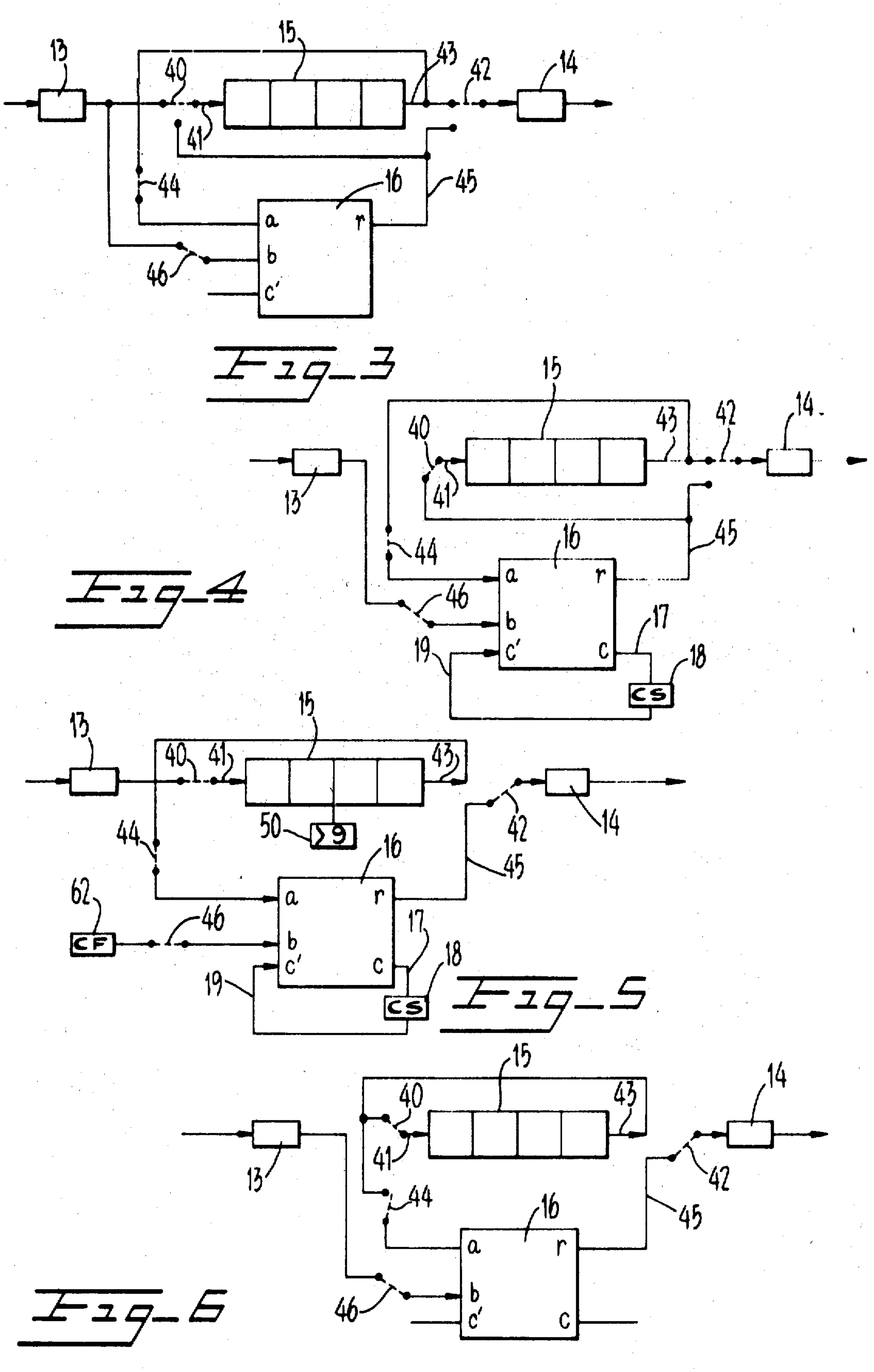
FIG. 3 is a simplified logic schematic of those elements of FIG. 1 which are active when the calculating unit is connected in an idling or noncalculating mode.
FIG. 4 is a simplified logic schematic of these elements of FIG. 1 which are active when the calculating unit is connected to handle two digits in an add or subtract mode of operation.
FIG. 5 is a simplified schematic of those elements of FIG. 1 which are active when the calculating unit is utilized to correct the result of a pure binary addition of two digits to binary coded decimal.
FIG. 6 is a simplified logic schematic of those elements of FIG. 1 which are active in one phase of the operation of the present invention to change the sequence of the data words on the delay line.

It is to be noted that when the calculating unit 11 is operating in the normal idling mode, as shown in FIG. 3, and FIG. 1, the result output lead 45 of the adder unit 16 is disconnected from both the shift register's input lead 41 and the memory input lead 47. Thus, regardless of any action that may be taking place in the adder unit during idling mode of operation, there will be no effect on either the input stage of the shift register or the input to the memory from the adder unit. In effect the adder unit is isolated from the delay line's normal idling circulation loop.

There will now be described action to add the contents of passive register $R_p$ to the contents of the active register $R_a$.

At the beginning of an addition problem, the control logic places the data flow control switches 40, 42 and 44 to the states or condition indicated in FIG. 3 (and FIG. 1) which is the normal position for the idling mode of operation as described previously.

Now during the first phase of the addition operation, the four bits ($B_0$–$B_3$) of the least significant digit ($D_0$) of the passive register $R_p$ are entered into the shift register 15 with the least significant bit ($B_0$) occupying the rightmost stage, the next least significant bit ($B_1$) occupying the stage next to the rightmost stage, the next to most significant bit ($B_2$) occupying the next to leftmost stage, and the most significant bit ($B_3$) occupying the leftmost stage of the shift register.

Thus, it can be understood that the least significant digit ($D_0$) of the passive register $R_p$ is contained in the shift register 15.

As soon as the shift register 15 receives the four bits ($B_0$–$B_3$) of the least significant digit ($D_0$) of the passive register $R_p$, the control logic starts the second phase of the addition operation.

At the beginning of the second phase of the addition operation, as shown in FIG. 4, the control logic causes the shift register input control means 40 to disconnect or cut off the memory output amplifier 13 from the input lead 41 of the shift register, and to provide a data flowpath between the result lead 45 of the adder 16 and the input lead 41 of the shift register. The data slow control means 42, 44, and 46 remain as before.

An output lead 19 of a binary carry storage flip-flop 18, which is part of the adder 16, is coupled with a third input "*c*" of the adder 16. The lead 17 will have a signal thereon indicative of a binary carry from the current addition of two binary "1"'s at the inputs "*a*," "*b*," and "*c*" according to the well-known rules of binary addition. Further, the carry flip-flop can be preset for purposes of decimal carry addition of a "one" to the next digit, as will be described below.

The least significant digit ($D_0$) of the next, or active register $R_a$ is then read or supplied to the "*b*" input of the adder 16. This action takes place serially bit-by-bit; i.e., the first bit ($B_0$) of the least significant digit ($D_0$) of the active register $R_a$ is read into the adder's "*b*" input, then the next bit ($B_1$), etc.

As the bits of the least significant digit ($D_0$) of the active register $R_a$ are read serially into the "*b*" input of the adder, the contents of the shift register 15 are also shifted serially bit-by-bit into the "*a*" input of the adder by way of the shift register's output lead 43 and data flow control means or switch 44. It will be recalled that the content of the shift register is, at this time, the least significant digit ($D_0$) of the passive register $R_p$.

The adder 16 is any well-known binary serial adder which implements the rules of binary addition for adding two binary bits and a carry. Such adders are well known and are not described in full detail here.

The sum, or result, of the addition of the least significant bits ($B_0$) of the least significant digits ($D_0$) of the active register $R_a$ and the passive register $R_p$ appears on the "*r*" output lead 45 of the adder and is entered into the leftmost stage of the shift register via data flow control switch 40 and shift register input lead 41.

At the same time that the least significant bit ($B_O$) of the least significant digit ($D_O$) of the passive register $R_p$ is shifted from the rightmost stage of the shift register to the adder, it is also shifted or read onto the memory via data flow control switch 42.

Now, as the next to least significant bit ($B_1$) of the active register $R_a$ is read into the "*b*" input of the adder, the next to least significant bit ($B_1$) of the passive register $R_p$ is both read into the "*a*" input of the adder and back onto the memory in the same manner as described for the least significant bits ($B_O$) of the two registers.

The two next least significant bits ($B_1$) plus and binary carry bit from the previous addition of least significant bits ($B_O$) will be added and their sum or result will appear in the adder's output lead 45 and be shifted or entered into the leftmost stage of the shift register.

Also, the next t o least significant bit ($B_1$) of the passive register $R_p$ is written back onto the memory in the same manner as described for the least significant bit ($B_O$) of the passive register $R_p$.

Action like that above described then takes place to add the next to most significant bits $B_2$) of the active and passive registers, to enter their sum into the leftmost stage of the shift register, and to write the next to most significant bit ($B_2$) of the passive register back onto the memory.

Then, action like that described above takes place to add together the most significant bits ($B_3$) of the active and passive registers, to shift the results of such addition into the leftmost stage of the shift register and to write the most significant bit ($B_3$) of the passive register back onto the memory.

It can be understood that the result of the binary addition operation will now be contained in the shift register, the former content of the shift register (least significant digit of passive register $R_p$) is back a the memory and the former value of the least significant digit ($D_O$) of the active register $R_a$ has been lost or destroyed.

Now, at the end of the second phase of the operation of adding the least significant digits ($D_O$) of the passive register $R_p$ and active register $R_a$, the content of the shift register is tested to determine if the binary code now contained therein is greater than nine, so that a correction can be made to enter onto the memory a correct BCD code for the new least significant digit of the active register $R_a$ and to generate and store a decimal carry for addition to the next digit resulting form the sum of the next to least significant digits ($D_1$) of the passive and active registers. The sequence of events to make the appropriate correction will now be described.

As excess nine detector unit 50 which is part of the control logic determines whether of not the shift register 15 contains a binary code representative of a decimal number greater than nine but less than 16. It is to be noted that only the four bit binary representation for decimal numbers 10, 11, 12, 13, 14, and 15 are detected as being greater than nine. The decimal numbers 16, 17, 18, and 19 are detected as zero, one, two, and three respectively, since only the first four, or least significant four, binary bits representative of such decimal numbers are contained in the four-stage shift register 15, while the fifth or most significant bit is recorded or stored in the carry storage flip-flop 18.

Now, assuming that the decimal number resting or contained in the shift register 15 at the end of the addition of four bits of the least significant digits ($D_O$) of the passive register $R_p$ and active register $R_a$ is greater than nine, but less than 16, the excess nine detector unit (FIG. 5) responds to such fact and causes the control logic to actuate data flow control means or switch 46 to couple the memory output amplifier 13 with the input of the shift register 15, to actuate data flow control switch 46 to couple the second or "*b*" input of he adder 16 with a source 62 to correction factor signals, and to actuate data flow control switch 42 to connect the adder's result output lead 45 with the memory input amplifier 14.

The function of the correction factor source 62 is to add a four-bit binary code for decimal "six" to the four-bit pure binary code now resting or contained in the shift register 15 as the contents of the shift register are entered onto the memory.

It will be clear to those skilled in the art to which the present invention pertains that a four-bit binary code for decimal "-six" added to a four-bit binary code for the decimal numbers 10, 11, 12, 13, 14, and 15, or to the four least significant bits of the binary codes for the decimal numbers 16, 17, 18, and 19 will result in a new binary code, the least four bits of which will be representative of the least significant decimal digit of the decimal number to which the binary code of "six" was added.

Now, as the least significant bit ($B_O$) of the least significant digit ($D_O$) of the first storage register $S_1$ exits from the memory, the contents of the shift register are shifted one place to the right, while the mentioned least significant bit ($B_O$) enters the leftmost state of the shift register and the former content of the rightmost stage of the shift register is shifted into the adder's "*a*" input. At the same time, the least significant binary bit of the correction code "six" is entered into the adder's "*b*" input from the correction factor signal source 62. The two binary bits now in the adder 16 are added together and their sum is transmitted to the memory as the new least significant bit ($B_O$) of the least significant digit (D) of the active register $R_a$; the carry flip-flop 18 is fully operative at this time and is utilized if necessary.

The next to least significant bit ($B_1$) of the least significant digit ($D_O$) of the first storage register $S_1$ then exits from the memory and at the same time, the content of the shift register is shifted one place to the right and in so doing, the just-mentioned next to least significant bit ($B_1$) enters the leftmost stage of the shift register, while the former content of the rightmost stage of the shift register is entered into the adder. Also, at the same time, the next to least significant binary bit of the binary code for the correct number "six" is shifted into the adder from the correction factor source 62. The two binary bits are added together with any binary carry that resulted from the previous addition of the first two binary bits of the correction operation and the result is entered onto the memory.

Then, the next to most significant binary bit ($B_2$) of the least significant digit ($D_O$) of the first storage register ($S_1$) exits from the memory and is entered into the leftmost stage of the shift register; the content of the shift register is shifted one place to the right and in so doing, the content of the rightmost stage of the shift register is entered into the "*a*" input of the adder while the next to most significant bit of the binary code for the correction of factor number "six" is entered in the "*b*" input of the adder. The two new bits in the adder are thus added together along with any binary carry bit from the previous addition, and the result is entered into the memory.

Then, the fourth or most significant bit ($B_3$) digit ($D_O$) of the least significant of the first storage register $S_1$ is read from the memory and entered into the leftmost stage of the shift register, while at the same time, the shift register is shifted one place to the right, thereby causing the content of the rightmost stage of the shift register to be entered into the "*a*" input of the adder. In addition, the fourth, or most significant binary bit, of the correction factor code for "six" is entered into the "*b*" input of the adder at this time. The two binary bits are thus added together along with any binary carry bit that was generated as a result of the previous addition, and the result is entered into the memory.

It can thus be understood that the uncorrected four-bit binary sum ($R_p$+$R_a$) that was formerly in the shift register has had a correction factor of "six" added thereto and the four-bit sum of such correction addition operation has been entered into the memory in the space time location normally occupied by the least significant digit ($D_O$) of the active register $R_a$ while the least significant digit ($D_O$) of the first storage register $S_1$ from the memory has been entered into the shift register.

Now, it will be understood that if the original four-bit code to which the correction factor of "six" is added was 10, 11, 12, 13, 14, or 15, there will be a binary carry bit generated as a result of addition of the last two bits and any binary carry from the previous binary addition; this binary carry bit is a fifth bit and as such is considered a decimal carry that must be added to the next higher order digit ($D_1$) of the active register $R_a$ when the next higher order digit ($D_1$) of the passive register $R_p$ and the active register $R_a$ are added together.

However, from the data flow chart of FIG. 2, it can be understood that the next higher order digit ($D_1$) of the passive register $R_p$ and the active register $R_a$ will not be available until after the least significant digits ($D_0$) of storage registers $S_2$–$S_6$ have been read from the memory (from the above, it will be recalled that the least significant digit ($D_0$) of the first storage register $S_1$ is contained in the shift register). Therefore, the control logic maintains the carry storage flip-flop 18 in the set condition for furnishing a carry of "one" to the adder-subtractor unit at the time the least significant bits ($B_0$) of the next to least significant digits ($D_1$) of the passive register $R_p$ and active register $R_a$ are furnished to the adder-subtractor unit.

If, at the time of the addition of the fourth binary bits ($B_3$) of the passive register $R_p$ and the active register $R_a$ the result is 16, 17, 18, or 19, the carry storage flip-flop is set. Setting of the carry flip-flop at this time will be detected by the control logic and will cause a correction factor of "six" to be added to the contents of the shift register as described above.

However, the control logic will record and store the fact that a decimal carry is required for transmittal to the adder-subtractor unit when the least significant bits ($B_0$) of the next digits ($D_1$) of the passive ans active registers are transmitted to the adder-subtractor unit. Thus, the control logic will set the carry storage flip-flop at the appropriate time for such carry bit to be furnished to the adder-subtractor unit.

If the operation of adding the two digits of the passive and active registers results in one, two, three, four, five, six, seven, eight, or nine, there is no decimal carry to be generated and the content of the shift register is the correct BCD code for the digit now to be written onto the memory as the new least significant digit ($D_0$) of the active register $R_a$.

Therefore, in the case of no correction required to the contents of the shift register, after the least significant digits of $R_p$ and $R_a$ have been added and are contained in the shift register, the control logic detects that no correction operation is required and causes the data flow control means or switches to be returned to the positions shown in FIG. 3. In such positions, the data that is in the shift register is caused to be shifted onto the memory as the new least significant digit ($D_0$) of the active register $R_a$. The least significant digits of the storage registers $S_1$–$S_6$ are read serially from the memory into the shift register and back onto the delay line as in the normal idling mode of operation.

In the case where a correction factor of "six" is added to the contents of the shift register described above, the logic control will place the data flow control switched to the conditions shown in FIG. 3 immediately after the last bit of the corrected code is entered onto the memory.

Normal idling mode operation then takes place to shift the contents of storage registers $S_2$–$S_6$ from the memory through the shift register and back onto the memory.

Then the next to least significant digit ($D_1$) of the passive register $R_p$ is read into the shift register in the normal idling mode (FIG. 3).

Immediately thereafter, the control logic sets up the data flow control means as shown in FIG. 4 for normal addition. Now, action like that described previously will take place to add the contents of the shift register (which at this time is the next to least significant digit of the passive register $R_p$) and the next digit read from the delay line (which at this time is the next to least significant digit of the active register $R_a$), and enter the result of such addition into the shift register while at the same time, shift the former contents of the shift register (the next to least significant digit of the passive register $R_p$) back onto the delay line.

However, it must be recalled that the carry storage flip-flop 18 may have been set by the addition of the previous digits of the passive and active registers. If the storage flip-flop 18 is set at the time the first bit of the next to least significant digit of the passive and active registers are entered into the adder, a one bit is entered into the carry input ($c'$) of the adder and added to the other bits contained therein. After such decimal carry bit is added in the adder, the storage flip-flop is reset and is thus in condition to be set again for normal adding operations as described previously.

After the next to least significant digits of the passive and active registers are added together, a correction operation is performed, if required, in the same manner as described for addition of the least significant digits of the passive and active registers.

Then, of course, action like that described above will take place nine more times to add the other digits ($D_2$–$D_{11}$) of the passive and active registers together and to place their sums in the digit positions of the active register $R_a$. After this is done, the control unit maintains the data flow control switches in the idling mode of operation (FIG. 3) until a new command is received.

It will be understood by those skilled in the art to which the present invention pertains, that upon command from the control logic, the adder-subtractor unit will operate in its subtraction $R_a$from the content of the passive register $R_p$, and enter the result ($R_p'-_{Ra}$) into the memory's space time positions for the active register $R_a$without destroying the content of the passive register. Further, it will be understood that appropriate operations for correcting the code in the shift register to a correct BCD code will be accomplished by subtracting a "six " from the content of the shift register, as the result is entered onto the memory, in a manner like that described above for adding a correction code of "six" from the correction factor unit 62.

Further, the carry storage flip-flop 18 utilized to take care of any binary and decimal borrow operations that may be encountered in the subtraction operation.

From the above description, it can be understood that the content of the passive register $R_p$ and the active register $R_a$can be arithmetically operated upon during an arithmetic operation cycle. The control logic is also able, upon appropriate command, to cause arithmetic operations to be performed upon the contents of the active register $R_a$ and the first storage register $S_1$ in a manner like that described for arithmetic operations upon the contents of the passive register $R_p$ and active register $R_a$. In particular, the content of the first storage register $S_a$ may be combined (added or subtracted) with the content of the active register $R_a$ and the results ($R_a \pm S_1$) placed onto the memory as the new contents of he first storage register $S_1$. It will be understood from the above description that such combining of the contents of the active register $R_a$ and the first storage register $S_1$ may be accomplished by controlling the flow of data bits through the shift register and adder-subtractor unit at the appropriate times by means of the data control means.

However, it is often desirous to perform arithmetic operations on the content of the active register $R_a$ and the contents of any selected one of the other storage registers ($S_2$–$S_6$). This is accomplished by a series of shifting operations now to be described.

For the purpose of this description, it is assumed that it is desired to add the content of the fourth storage register $S_4$ to the content of the active register $R_a$.

During the first phase of the shifting operations, the data flow control means are as shown in FIG. 3 ($D_0$) of the first storage register $S_1$into the shift register 18. (The least significant digits of the passive and active registers are, of course, read back onto the memory according to the normal idling mode of operation.)

Then, the control logic switches tee data flow control switches 40, 42, 44 and 46 to the conditions indicated in FIG. 6. In such positions, the data read from the memory enters the "*b*" input of the adder-subtractor unit and, since no other data is presented to the other inputs ("*a*" and "*c'*") of the adder, is immediately written back onto the memory takes place only for the time required to read the least significant digits ($D_0$) of the storage registers $S_2$–$S_6$. During this time, the shift register which it will be recalled contains the least significant digit ($D_O$) of the first storage register $S_1$, is ring shifted on itself. It can be understood that the above flow of data causes the contents of the least significant digits ($D_O$) of the upper five storage registers ($S_2$–$S_6$) to be written back onto the memory in the least significant digit positions ($D_O$) of the lower five storage registers ($S_1$–$S_5$) respectively, and while this action is taking place, the former content of the least significant digit of the first storage register $S_1$ is stored by ring shifting in the shift register.

Now, immediately after the original least significant digit of sixth storage register $S_6$ is read onto the memory in the least significant digit position of the fifth storage register, $S_5$, the control logic changes the data flow control means to their normal idling positions, as shown in FIG. 3.

The next to least significant digit of the passive register $R_p$ is read from the memory into the shift register, and at the same time, the former content of the shift register is written onto the memory in the least significant digit position of the sixth storage register $S_6$.

Then, the content of the shift register (which, it will be recalled is the next to least significant digit of the passive register $R_p$) is written back onto the memory while at the same time, the next to least significant digit ($D_1$) of the active register $R_a$ is read into the shift register.

The next to least significant digit ($D_1$) of the first storage register $S_1$ is then read into the shift register while at the same time, the content of the shift register (next to least significant digit of the active register $R_a$) is written onto the memory.

The control logic then changes the settings of the data flow control switches to their conditions as shown in FIG. 6. It will be understood from the previous discussion in connection with FIG. 6 that the contents of the next to least significant digits of the storage registers $S_1$–$S_6$ will be read from the memory and written back onto the memory in the positions associated with the next to least significant digit positions associated with storage registers $S_1$–$S_5$, respectively.

Then, as described before, the control logic will change the data flow control switches to their positions indicated in FIG. 3. In the manner like that described before, the second least significant digit ($D_2$) of the passive register $R_p$ is read into the shift register while at the same time, the content of the shift register (which it will be recalled is the next to least significant digit of the first storage register $S_1$) is written onto the delay line.

Thus, the next to least significant digit of storage registers $S_2$–$S_6$ have been shifted to the next to least significant digit positions of he next lower order storage register ($S_1$—$S_5$) respectively, while the next to least significant digit of the first storage register $S_1$ has been placed in the next to least significant digit position of the sixth storage register $S_6$.

Action like that described above takes place ten more times to cause the remaining digits of the five higher order storage registers $S_2$—$S_6$ to be rewritten on the delay line at corresponding digit positions of the next lower order storage registers $S_1$–$S_5$, respectively, and the remaining digits of the first storage register $S_1$ to be rewritten on the delay line in the corresponding digit positions of the sixth storage register $S_6$.

Now, the above-described action to shift or move the digits of the first storage register $S_1$ to the sixth storage register $S_6$, and to move the digits of the five higher order storage registers to the next lower order storage registers takes place two more times. This will cause the original or initial digits of the fourth storage register $S_4$ to be contained in the first storage register positions $S_1$ on the memory, while the original contents of the first, second, third, fifth, and sixth storage registers will now be contained in the positions for the upper five storage registers, respectively.

Now, the content of the first storage register $S_1$ may be combined (added to or subtracted from) with the content of the active register $R_a$ in a manner similar to that described above for addition and subtraction of the of the active register $R_a$ with the content of the passive register $R_p$.

What is claimed is:

1. In an apparatus for handling a plurality of data words wherein each data word in comprised of a predetermined number of decimal digits, and each decimal digit is represented in said apparatus by signals indicative of a predetermined number of binary bits, the combination comprising a dynamic memory having a serial binary input and a serial binary output;

an arithmetic unit including a binary serial adder-subtractor means, and a shift register having a plurality of stages equal in number to said predetermined number of binary bits and having a serial binary input and a serial binary output;

said adder-subtractor means having a first binary bit input, a second binary bit input, and a binary bit output, said adder-subtractor means being responsive to binary bit at its output, said adder-subtractor means being selectively operable to furnish at its output a binary bit representative of the arithmetic sum of binary bits furnished to its inputs, and to furnish at its output a binary bit representative of the arithmetic difference resulting from a binary bit at said second input being subtracted from a binary bit at said first input;

memory input data flow means selectively operable between a first condition wherein said shift register output is coupled with said adder-subtractor means output is coupled with said memory input;

means coupling said shift register output with said first input of said adder-subtractor means;

Shift register input data means selectively operable between a first condition wherein said memory output is coupled with said shift register input, and a second position wherein said adder-subtractor means output is coupled with said shift register input;

means coupling said memory output with said second input of said adder-subtractor means;

said memory input means and said shift register input means operable in a predetermined sequence wherein a first data word is read from said memory into said shift register and written back onto said memory without change, and a second data word is read from said memory into said adder-subtractor means, arithmetically combined with said first data word therein and the results of such arithmetic combining being written into said memory in the location formerly occupied by said second data word;

said operable sequence taking the same time as a second operable sequence wherein all data words are read from said memory through said shift register and back onto said memory without change.

2. In an apparatus according to claim 1 wherein each of said digits in said memory is represented by a binary coded decimal code, and there is further included means coupled to said arithmetic unit for correcting the sum and differences resulting from the addition and subtraction respectively of said two data words to a correct binary coded decimal code and for storing a decimal carry and decimal borrow to be added and subtracted respectively from the next digit of the second data word to be added and subtracted respectively.

3. In an apparatus according to claim 2 wherein said correcting means includes means for generating a set of serial binary bit signals representative of the decimal numeral "six", and means coupled to said means operatively coupling said memory output with said second input of said adder-subtractor for causing said operatively coupling means to be selectively operable between a first condition wherein said memory output is coupled with said second input of said adder-subtractor means, and a second condition wherein said means for generating a set of binary bit signals representative of the decimal numeral "six" is coupled with said second input of said adder-subtractor means.

4. In an apparatus according to claim 2 wherein said shift register input means is further selectively operable to a third condition wherein said shift register output is coupled with said shift register input; and means coupled to said memory input means and said shift register input means for causing said input control means to be further operable in a predetermined sequence wherein a digit of a predetermined order data word is read from said memory into said shift register and the same order digits of the higher order data words are read from said memory through said adder-subtractor unit without change and written back onto said memory;

said means coupled to said input means causing said digit in said shift register to be ring shifted while said same order digits of said higher order data words are being read from said memory through said adder-subtractor unit and written back onto said memory;

said means coupled to said input means causing said digit in said shift register to be written onto said memory subsequent to the writing of said higher order digits back onto said memory whereby said predetermined order data word is written back onto said memory as the highest order data word and the data words previously of higher order than said predetermined order data word are written back onto said memory in the next lower order position.